Aug. 12, 1958     A. D. SMITH     2,847,553
CONTROL FOR HEATING APPARATUS
Filed July 5, 1957     2 Sheets-Sheet 1
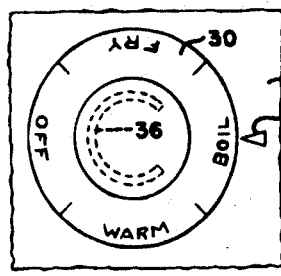
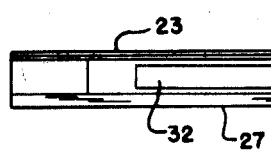
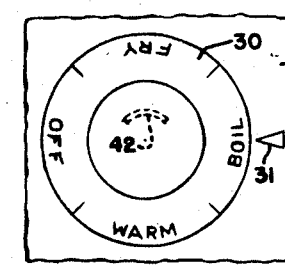
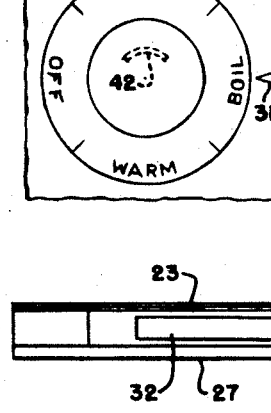
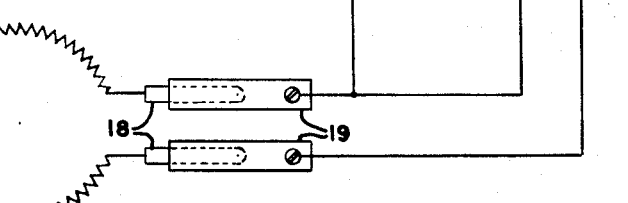
INVENTOR
ALAN D. SMITH
BY *M. C. Frendenberg*
ATTORNEY Aug. 12, 1958   A. D. SMITH   2,847,553
CONTROL FOR HEATING APPARATUS
Filed July 5, 1957   2 Sheets-Sheet 2
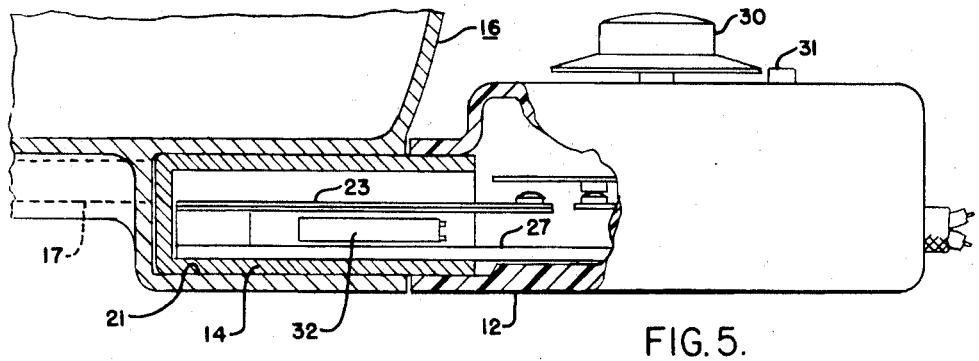
FIG. 5.
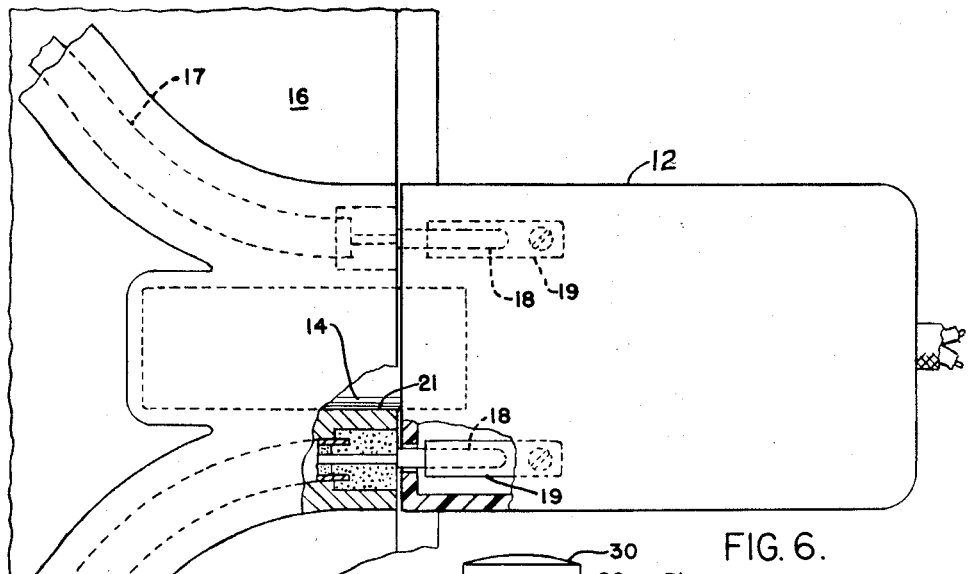
FIG. 6.
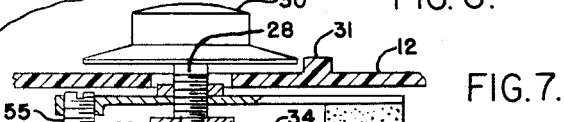
FIG. 7.
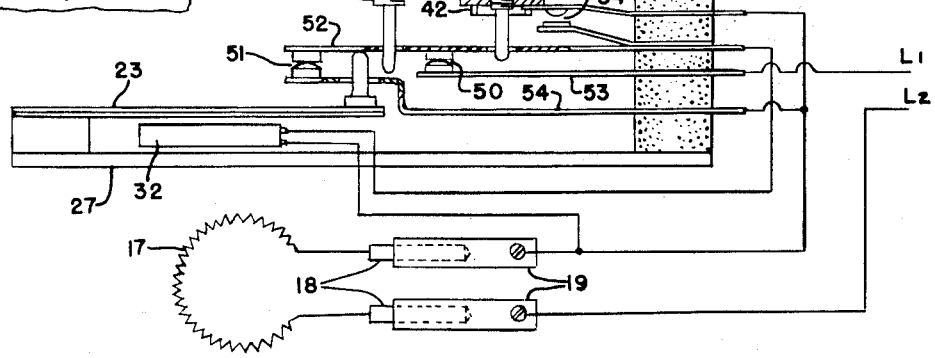

United States Patent Office 2,847,553
Patented Aug. 12, 1958

2,847,553

CONTROL FOR HEATING APPARATUS

Alan D. Smith, Mansfield, Ohio, assignor to Westinghouse Electric Corporation, East Pittsburgh, Pa., a corporation of Pennsylvania Application July 5, 1957, Serial No. 670,046

10 Claims. (Cl. 219—44)

This invention relates to a thermally responsive control for an electrically heated appliance, particularly for a cooking vessel of the type in which the rate of boiling or the vessel temperature may be regulated for various cooking operations.

Among the objects of this invention is to provide an improved low cost control of the above mentioned type.

Another object of this invention is to provide an improved control of the above type that may be readily detached from a portable cooking vessel.

A control made in accordance with this invention includes a thermally responsive element for sensing the temperature of a cooking vessel and for actuating a main switch for controlling the vessel heater in response to changes in vessel temperature. In addition to the main switch, the control includes a manually adjustable auxiliary switch for controlling energization of an auxiliary heater disposed adjacent the thermally responsive element. This auxiliary switch is actuated to enable the auxiliary heater to cycle the main switch during a boiling operation. The auxiliary heater is deenergized for certain other operations in which the main switch is cycled by the thermally responsive element primarily in response to changes in vessel temperature.

Another feature of this invention includes the addition of a thermally actuated auxiliary switch for controlling the energization of the auxiliary heater. This latter switch opens at a temperature just below the boiling temperature of the vessel contents for preventing the main switch from cycling before the vessel reaches this temperature during a controlled boiling operation. Both the main switch and the auxiliary thermally responsive switch are actuated by the same thermally responsive element.

A further feature of this invention is the arrangement of the thermally responsive element and the auxiliary heater therefor in a probe that may be disposed in good heat transfer relationship with the vessel and being readily removable therefrom.

The foregoing and other objects are effected by the invention as will be apparent from the following description and claims taken in connection with the accompanying drawings, forming a part of this application, in which:

Fig. 1 is a view of the thermally responsive control of one embodiment of the invention and showing the electrical circuits schematically;

Fig. 2 is a plan view of an adjustable control knob for the control of Fig. 1;

Fig. 3 is a view similar to Fig. 1, but illustrating another embodiment of the invention;

Fig. 4 is a plan of the adjustable control knob for Fig. 3;

Fig. 5 is a side elevation, partially cut away, of the control device of Fig. 1 with an enclosure therefor, the control device being shown connected to a heating vessel;

Fig. 6 is a bottom view of the structure shown in Fig. 5; and

Fig. 7 is a view similar to Fig. 3 of a third embodiment of the invention having generally the same circuit arrangement as in Fig. 3, but with a modified switching structure.

*First embodiment*

Referring to the first embodiment of the invention shown in Figs. 1, 2, 5 and 6, a control device is arranged in a detachable plug or housing comprising an electrically insulating shell 12 and a closed tubular probe 14 extending therefrom. The control device as shown in Fig. 5 is attached to a heating vessel 16. The vessel includes a tubular sheathed heater 17 cast in the bottom wall thereof and having projecting male electrical terminals 18 extending generally parallel to each other at one side of the vessel. These male terminals 18 are received by female connectors 19 in the insulating shell 12 for making electrical connections to switches therein controlling energization of the vessel heater 17 from a suitable power source indicated in Fig. 1 by conductors $L_1$ and $L_2$.

Disposed between the ends of the vessel heater at the bottom of the vessel is a socket or tubular recess 21 for receiving the tubular male probe 14 of the control device. The probe 14 may be formed as an aluminum extrusion of such dimensions as to be manually slidable into the socket 21 and fit therein in good heat transfer relationship with the bottom wall of the vessel 16. Disposed within the probe is a thermally responsive bimetal element 23 for actuating a main switch 25 in the insulating shell 12 to control the vessel heater 17.

Referring now to Fig. 1 for details of the control device and the circuit therefor, the bimetal element 23 is carried by one end of an elongated support 27 which may be fixed in the insulating shell 12 and probe 14 in any suitable manner with the bimetal element 23 in good heat transfer relationship with the probe. Also carried by the support 27 at its other end is a manually adjustable switch structure including the main switch 25 that is actuated by the bimetal element 23. The main switch 25 has a pair of contacts carried by electrically conducting spring blades and is manually adjustable by means of a screw 28 suitably supported relative the support 27 and carrying an insulating pin extending from its end engaging one of the blades. The screw 28 is manually adjustable by means of a knob 30 carrying indicia cooperating with an index 31 on the shell 12 to indicate the adjusted positions of the control to be described hereinafter.

An auxiliary heater 32 is disposed in the probe 14 in good heat transfer relationship with the bimetal element 23 and is electrically connected in series with the vessel heater 17 and the main switch 25. The heater 32 is of relatively low resistance compared to the vessel heater and has a low level of energization, of the order of 10 watts, whereas the vessel heater is energized at approximately 1,000 watts. The auxiliary heater may be shunted and effectively deenergized by an auxiliary switch 34, for a purpose to be described hereinafter, without materially affecting the heat output of the vessel heater. The contacts of the auxiliary switch 34 are biased apart and the switch may be closed by means of a cam 36 fixed on the adjusting screw. The portion of the cam which actuates the switch to its closed position is indicated by dotted lines in Fig. 2 and keeps the switch closed for all adjustments of the knob 30 except those for boiling operations.

*Operation—Figs. 1 and 2*

The control device of Fig. 1 may be adjusted for temperature regulation in "warm" and "fry" ranges as indicated by indicia on the control knob 30 in Fig. 2. In the "warm" range the main switch 25 may be adjusted to open and de-energize the vessel heater 17 when the bimetal element 23 attains a selected temperature from 100° F. to 185° F. In the "fry" range this temperature selection may be from approximately 260° F. to 400° F. In both the "warm" and the "fry" ranges, the auxiliary switch 34 is held closed so that the bimetal 23 receives no heat from the auxiliary heater 32 and the control device functions with the main switch 25 cycling primarily in response to changes in vessel temperature.

For regulating boiling operations in which the vessel temperature will not rise above the boiling temperature of its liquid contents, usually water, the auxiliary switch 34 is opened by adjustment of the knob 30 to the "boil" range to energize the auxiliary heater 32 in series with the vessel heater 17. Thus, the bimetal element 23 will receive heat from heater 32 in addition to the heat received from the vessel 16 to effect opening of the main switch at a selected temperature of the bimetal in the "boil" range between 185° F. and 260° F. Since the auxiliary heater 32 will have to supply the heat to raise the bimetal to any selected control temperature setting above the boiling temperature, a high temperature selected by moving the knob 30 to the upper end of the "boil" range will require more heat from the auxiliary heater 32 and will result in the main switch 25 remaining closed for a greater percentage of time during its cycling operation. Accordingly the vessel heater 17 will be energized at a high average wattage causing a high boiling rate. For a knob setting in the lower part of the "boil" range, the selected temperature will be lower and the main switch 25 will cycle with a lower percentage of closed contact time, resulting in a lower heat output of the vessel heater 17 and a lower boiling rate. Thus, the rate of boiling may be varied by adjusting the control knob 30 within the "boil" range.

The frequency at which the switch 25 cycles between open and closed positions by the heating and cooling, respectively, of the bimetal 23 while controlling a boiling operation is preferably high enough that the apparent vigor of boiling does not change, that is, the apparent rate of bubbling while water is boiling, for example, would not greatly change between the off and on periods of the switch 25.

Second embodiment

Referring to Figs. 3 and 4, a second embodiment of this invention includes a control device generally similar to that of the first embodiment and designed for similar use with the vessel 16 shown in Figs. 5 and 6. The control device of Fig. 3 differs from that of Fig. 1 by the addition of another switch 40 arranged to be actuated by the bimetal element 23 and connected in parallel or shunt with the auxiliary heater 32 and the shunting switch 34. The cam 42 for actuating the shunting switch 34 has also been modified in a manner to be described hereinafter.

The main switch 25 in Fig. 3 is manually adjusted and thermally actuated in the same manner as in Fig. 1. The thermally actuated auxiliary switch 40 includes a pair of contacts carried by resilient blades, one of the blades being self-biased into engagement with an adjustable screw which determines the temperature of the bimetal element at which this switch will be opened. This switch 40 is preferably adjusted to open at a bimetal temperature which is slightly below the boiling temperature of the liquid contents of the vessel 16, for example, 185° F. The cam 42 for the manually adjustable switch 34 which shunts the auxiliary heater is designed to close this switch when the control knob is adjusted to any position within the "fry" range, as indicated by the dotted lines in Fig. 4, the switch 34 being open in both the "warm" and "boil" ranges.

Operation—Fig. 3

The operation of the control device of Fig. 3 is generally similar to that of Fig. 1 in that the main switch is caused to cycle primarily in response to changes in vessel temperature when the control knob 30 is adjusted in both the "warm" and "fry" ranges. The auxiliary heater may be energized when knob 30 is adjusted within the "boil" range to effect cycling of the main switch 25 in response to heat from both the vessel 16 and the auxiliary heater 32 to maintain a selected rate of boiling.

For adjustments of knob 30 in the "warm" range, the switch 34 will be open and the thermally actuated shunting switch 40 will be closed. In this range, the main switch 25 will be opened at selected bimetal temperatures below the temperature at which the switch 40 is opened and thus the auxiliary heater 32 will remain shunted by the switch 40 as the main heater 17 is cycled by the main switch 25.

For adjustments of knob 30 in the "fry" range the shunting switch 34 will be held closed and temperature regulation will take place as described above for similar adjustments of the control of Fig. 1.

When the control knob 30 of Fig. 3 is adjusted to the "boil" range, the main switch 25 may be opened at a selected temperature of the bimetal element 23 above the boiling temperature of the vessel contents. The shunting switch 34 will be opened by the cam 42, but the thermally actuated shunting switch 40 will remain closed to keep the auxiliary heater 32 deenergized until the vessel temperature attains the value just below boiling at which the bimetal opens the switch 40. During this interval the vessel heater is continuously energized to rapidly bring the vessel contents up to boiling. After the shunt switch 40 opens, the temperature of the vessel continues to rise to the boiling temperature and the shunting switch 40 remains open, causing the auxiliary heater 32 to supply additional heat to the bimetal element 23 to raise it above the boiling temperature to a temperature, selected by the knob 30, at which the bimetal opens the main switch 25. The main switch 25 will be cycled with a percentage of closed contact time dependent upon the temperature setting of this switch above the boiling temperature and within the "boil" range. If a cold body of food were deposited in the vessel causing the temperature of the latter and the bimetal 23 to drop below the temperature at which the shunting switch 40 is opened, the latter will close and the vessel heater 17 will be energized continuously until the shunting switch 40 is again opened. This assures rapid recovery to the boiling temperature.

Third embodiment

The embodiment of the invention shown in Fig. 7 is designed to control cooking operations in the same manner as the control shown in Figs. 3 and 4. The only distinction between this embodiment and that of Fig. 3 is the structure of the main switch 50 and the thermally actuated shunting switch 51. These switches 50 and 51 correspond in function to the main switch 25 and shunting switch 40 of Fig. 3, respectively. In all other respects this embodiment is the same in construction and operation as that in Fig. 3.

As in the other embodiments, the switching structure in Fig. 7 is carried by the end of the support 27 opposite the portion of the latter that carries the bimetal 23 and extends into the tubular probe 14. One of the spring blades of Fig. 3 has been omitted in Fig. 7 by mounting the upper thermally actuated contact of each of the switches 50 and 51 on a single arm or spring blade 52. The contacts of switches 50 and 51 on blade 52 engage corresponding contacts carried by upwardly biased spring blades 53 and 54, respectively. As the bimetal element is heated to deflect upwardly and move the blade 52, the contacts on the blades 53 and 54 follow the contacts on the blade 52 until the blades 53 and 54 engage electrically insulating pins projecting from the adjusting screws 28 and 55, respectively. The blade 52 is biased downwardly and, when the bimetal element 23 is cool, holds the blades 53 and 54 out of engagement with the pins in the adjusting screws 28 and 55. The blade 52 may at all times be biased into engagement with the electrically insulating pin on the end of the bimetal element 23.

The screw 55 is preferably adjusted so that the shunting switch 51 will open when the bimetal element attains a temperature of approximately 185° F. The main adjusting screw 28 may be adjusted so that the main switch 50 will be actuated in the same manner as the main switch 25 in Fig. 3.

Since the operation of the third embodiment is like that of Fig. 3, it need not be again described.

It is intended that the controls of Figs. 3 and 7 may be assembled in a detachable plug arrangement like that shown in Figs. 5 and 6. However, most of the shell 12 and the probe 14 have been omitted from Figs. 3 and 7 for the sake of clarity.

In each of the above embodiments an improved thermally responsive control is provided for either regulating the rate of boil for cooking operations involving boiling or maintaining accurate temperature control for other types of cooking operations in an electrically heated vessel. By providing an auxiliary heater for a thermal sensing element in an elongated probe, the subject invention is particularly useful in controls that may be made readily detachable from cooking vessels so that the latter may be completely immersed to facilitate cleaning.

While the invention has been shown in several forms, it will be obvious to those skilled in the art that it is not so limited, but is susceptible of various other changes and modifications without departing from the spirit thereof.

What is claimed is:

1. In a control for a cooking appliance having a heating element, the combination of a main switch controlling energization of the heating element, a device responsive to the temperature of said appliance for actuating said switch, an auxiliary heater for said device, a second switch controlling energization of said auxiliary heater, and manually adjustable means for determining the temperature of said device at which said main switch is actuated and for controlling said second switch, said manually adjustable means having one range of adjustment in which it controls the second switch to deenergize said auxiliary heater, thereby conditioning said main switch for actuation primarily in response to the temperature of said appliance, said manually adjustable means having a second range of adjustment, throughout which said second switch is actuated to condition said auxiliary heater for energization under control of the main switch, providing actuation of said main switch in response to heat received by said device from both the appliance and the auxiliary heater.

2. In a control for an electrically heated cooking vessel having a heating element, the combination of a main switch controlling energization of the heating element, a device responsive to the temperature of said vessel for actuating said main switch, an auxiliary heater for said device, a second switch controlling energization of said auxiliary heater, said second switch being connected in shunt with said auxiliary heater and in series with said main switch, manually adjustable means for controlling the second switch and for determining the controlling temperature of said device at which the main switch is actuated, said manually adjustable means having one range of adjustments for varying said controlling temperature to provide different rates of boiling within said vessel, said one range including as a controlling temperature the boiling temperature of water, said second switch being opened when the manually adjustable means is in said one range, said manually adjustable means having a second range of adjustments of the controlling temperature throughout which said second switch is held closed.

3. A control device for attachment to a cooking vessel that is provided with an electrical heater and electrical terminals therefor, said control device comprising a plug having electrical terminals for connection to the terminals on said vessel, a probe extending from said plug for sensing the temperature of said vessel, said probe comprising a thermally responsive element, a main switch in said plug actuated by said element for controlling the energization of the vessel heater, an auxiliary heating element for said thermally responsive element, a second switch in said plug for controlling energization of said auxiliary heating element under primary control of said main switch, and manually adjustable means for controlling said second switch and adjusting said main switch to determine the temperature of said thermally responsive element at which said main switch is actuated, said manually adjustable means having a first range of adjustments for controlling a boiling operation in said vessel and a second range of adjustments for maintaining the temperature of said vessel at values other than the temperature value for the boiling operation, said second switch being controlled by said manually adjusting means when the latter is adjusted in said second range to prevent heating of the thermally responsive element by said auxiliary heater, said second switch being controlled by said manually adjustable means when the latter is adjusted in said first-mentioned range to effect energization of said auxiliary heater under control of the main switch.

4. A control for a cooking vessel having an electrical heater, said control comprising a thermally responsive element for sensing the temperature of said vessel, a main switch actuated by said thermally responsive element for controlling energization of the vessel heater, manually adjustable means for varying the temperature of said element at which said main switch is actuated, an auxiliary heater in series with said main switch and in good heat transfer relationship with said thermally responsive element, a second switch movable to a first position for conditioning the auxiliary heater for energization under control of the main switch and to a second position for inactivating the auxiliary heater, and means actuated by said element and effective in response to an increase in the temperature thereof to a value below the temperature value at which a boiling operation is carried out in the vessel for moving said second switch to its first position.

5. A control for a cooking vessel having an electrical heater secured thereto and provided with exposed electrical terminals for said heater, said control comprising a housing that is supported by said vessel and is manually detachable therefrom, said housing containing electrical connecting means for making connections to said terminals, a temperature sensing probe extending from said housing in good heat transfer relationship with said vessel, said probe comprising a thermally responsive element, a main switch within said housing actuated by said thermally responsive element for controlling the vessel heater, manually adjustable means for varying the temperature of said element at which said main switch is actuated, an auxiliary heater in good heat transfer relationship with said temperature responsive element, a second switch in said housing actuated by said thermally responsive element for controlling energization of said auxiliary heater, said second switch being adjusted to effect heating of said element by the auxiliary heater under primary control of said main switch when said element attains a predetermined temperature below the temperature at which a boiling operation is carried out in said vessel.

6. A control for an electrically heated cooking vessel having a heater, said control comprising a main switch for connection in series with the vessel heater, a thermally responsive element for sensing the temperature of said vessel and actuating said main switch, an auxiliary heater for said element, a second switch connected to shunt said auxiliary heater, said second switch being actuated by said thermally responsive element and opened thereby at a predetermined temperature below the temperature at which a boiling operation is performed in said vessel, a third switch shunting said auxiliary heater, manually adjustable means for selecting the temperature of said thermally responsive element at which said main switch is actuated and for actuating said third switch, said manually adjustable means having one range of adjustment in which said third switch is maintained open and said main switch is adjusted to control a boiling operation in said vessel, said manually adjustable means having a second range for adjustments in which said third switch is held closed and said main switch is adjustable to open at different temperatures of said thermally responsive element.

7. A control for an electrically heated cooking vessel having a heater, said control comprising a thermally responsive element for sensing the temperature of said vessel, a main switch actuated by said thermally responsive element for controlling the vessel heater, manually adjustable means for varying the temperature of said element at which said main switch is actuated, an auxiliary heater in good heat transfer relationship with said element connected in series with said main switch, a second switch actuated by said thermally responsive element for controlling said auxiliary heater, said second switch being adjusted to effect heating of said element by said auxiliary heater under control of the main switch when the element attains a predetermined temperature below the temperature at which a boiling operation is carried out in the vessel, a third switch for preventing heat output from the auxiliary heater, means connected to said manually adjustable means for actuating said third switch, said manually adjustable means having one range of adjustments for varying the average heat output of the vessel heater during boiling operation in said vessel, said third switch being actuated to permit energization of said auxiliary heater for adjustments of said manually adjustable means throughout the one range, said manually adjustable means having a second range of adjustments in which said third switch maintains said auxiliary heater deenergized and in which said main switch may be adjusted to control the vessel temperature at any of a plurality of temperature values.

8. A control for a cooking vessel that has an electrical heater secured thereto and is provided with exposed electrical terminals for said heater, said control comprising a plug that is manually attachable to said vessel and contains electrical connecting means for making electrical connections to the vessel heater, a male temperature sensing probe extending from said plug for disposal in good heat transfer relationship with said vessel, said probe comprising a thermally responsive element, a main switch within said plug arranged to be actuated by said thermally responsive element for controlling the vessel heater, manually adjustable means for varying the temperature of said element at which said main switch is opened, an auxiliary heater in said probe in good heat transfer relationship with said temperature responsive element and controlled by said main switch, a second switch in said plug actuated by said thermally responsive element and connected to shunt said auxiliary heater, said second switch being adjusted to open at a predetermined temperature of said element below the temperature at which a boiling operation is carried out in said vessel, a third switch in said plug arranged to shunt said auxiliary heater and actuated by said manually adjustable means, said manually adjustable means having one range of adjustments for selecting the average heat output of the vessel heater during a boiling operation in said vessel, said third switch being held open during adjustment of said manually adjustable means throughout said one range, said manually adjustable means having a second range of adjustments in which said third switch is held closed and said main switch may be adjusted to control the temperature of said vessel at any of a plurality of temperature values.

9. A control for an electrically heated cooking vessel having a heater, said control comprising a thermally responsive element for sensing the temperature of said vessel, a main switch actuated by said thermally responsive element for controlling energization of the vessel heater, manually adjustable means for varying the temperature of said element at which said main switch is actuated, an auxiliary heater in good heat transfer relationship with said element, a second switch movable to a first position for conditioning the auxiliary heater for energization under control of the main switch and to a second position for inactivating the auxiliary heater, means actuated by said element and effective in response to an increase in the temperature thereof to a value below the temperature value at which a boiling operation is carried out in the vessel for moving said second switch to its first position, said main and second switches comprising respective pairs of contacts, and a common, electrically conducting, resilient arm carrying one contact of each pair and moved by said thermally responsive element for the actuation of both switches.

10. A control for an electrically heated cooking vessel having a heater, said control comprising a thermally responsive element for sensing the temperature of said vessel, a main switch actuated by said thermally responsive element for controlling the energization of the vessel heater, manually adjustable means for varying the temperature of said element at which said main switch is actuated, an auxiliary heater in good heat transfer relationship with said element, a second switch actuated by said thermally responsive element for controlling said auxiliary heater, said second switch being adjusted to effect heating of said element by said auxiliary heater when the element attains a predetermined temperature below the temperature at which a boiling operation is carried out in the vessel, each of said switches comprising a pair of contacts, an electrically conducting resilient arm carrying one of the contacts of each switch and moved by said element to actuate said switches, a third switch actuated by said manually adjustable means for preventing heating of the auxiliary heater, said manually adjustable means having one range of adjustments for selecting the average heat output of the vessel heater during a boiling operation, said third switch being actuated to permit energization of said auxiliary heater for adjustments of said manually adjustable means throughout said one range, the manually adjustable means having a second range of adjustments in which said third switch maintains said auxiliary heater deenergized and in which said main switch may be adjusted to control the vessel temperature at any of a plurality of temperature values.

References Cited in the file of this patent

UNITED STATES PATENTS

| | | |
|---|---|---|
| 1,680,398 | Thomas | Aug. 14, 1928 |
| 2,005,584 | Heyroth | June 18, 1935 |
| 2,409,420 | Clark | Oct. 15, 1946 |
| 2,410,013 | Clark | Oct. 29, 1946 |
| 2,611,855 | Turner | Sept. 23, 1952 |

UNITED STATES PATENT OFFICE
CERTIFICATE OF CORRECTION

Patent No. 2,847,553                                   August 12, 1958

Alan D. Smith

It is hereby certified that error appears in the printed specification of the above numbered patent requiring correction and that the said Letters Patent should read as corrected below.

Column 7, line 4, for "range for adjustments" read -- range of adjustments --.

Signed and sealed this 16th day of December 1958.

(SEAL)
Attest:

KARL H. AXLINE
Attesting Officer

ROBERT C. WATSON
Commissioner of Patents